United States Patent [19]

Kasner et al.

[11] Patent Number: 4,683,365
[45] Date of Patent: Jul. 28, 1987

[54] LASER BEAM TRANSPORT SYSTEM

[75] Inventors: William H. Kasner, Penn Hills Township, Allegheny County; Martin H. Cooper, Churchill Boro, both of Pa.; Clark E. Swenson, Orchard Park, N.Y.; Albert P. Ciez, Monroeville; Katherine M. Andrews, Shadyside, both of Pa.

[73] Assignee: Westinghouse Electric Corp., Pittsburgh, Pa.

[21] Appl. No.: 844,422

[22] Filed: Mar. 26, 1986

[51] Int. Cl.⁴ .............................................. B23K 26/00
[52] U.S. Cl. ....................... 219/121 LC; 219/121 LQ; 219/121 LP; 219/121 LU
[58] Field of Search ................. 219/121 LA, 121 LB, 219/121 LC, 121 LD, 121 LG, 121 LN, 121 LP, 121 LQ, 121 LU, 121 LV, 121 L, 121 LM

[56] References Cited

U.S. PATENT DOCUMENTS

| 3,588,439 | 6/1971 | Heller .......................... 219/121 LH |
| 4,316,074 | 2/1982 | Daly ............................ 219/121 LT X |
| 4,358,659 | 11/1982 | Sophnheimer ........... 219/121 LH X |
| 4,456,812 | 6/1984 | Neiheisel et al. ........ 219/121 LQ X |

Primary Examiner—C. L. Albritton
Attorney, Agent, or Firm—F. J. Baehr, Jr.

[57] ABSTRACT

A laser welding beam transport system is provided in which the laser beam 14 emanating from the laser generator 10 is expanded in diameter in an expander 16 at a location close to the generator, and then is transported in its expanded diameter to a remote location where the beam is reduced in diameter in a beam reducer 26 at a location close to the welding station 28 for the purpose of maintaining a relatively constant power density of the beam at the station over a significant range of working travel of the working station.

4 Claims, 2 Drawing Figures

LASER BEAM TRANSPORT SYSTEM

GOVERNMENT CONTRACT

The Government has rights in this invention pursuant to Contract No. N00014-83-C-2226 awarded by the U.S. Department of Defense.

BACKGROUND OF THE INVENTION

Welding processes using lasers, such as high power continuous wave (CW) $CO_2$ lasers, for example, require nearly constant energy deposition at the weld to produce acceptable welds. With robotic or automated laser welding systems which are required to function over a wide travel range such as an extended length weld on a large work piece, divergence of the laser beam as it travels from the laser generator in one location to the workpiece at a relatively remote location, will result in changes in the focal spot diameter at the weld. This effect results from the larger, diverged beam diameter at the focusing optics which have a fixed focal length. The f number, which is defined as the focal length of the focusing optics divided by the beam diameter, decreases as the beam diameter increases, thereby changing the focusing of the beam. Since the power density is a function of the square of the focal spot diameter, the welding parameters are very sensitive to the beam diameter.

Laser beams produced by commerically available, high power (12 to 25 kW) continuous wave $CO_2$ lasers, for example, are about 2 to 3 inches (0.051 to 0.076 m) in nominal diameter. These size beams are subject to enlarging significantly in diameter in accordance with their transport over large distances from the laser generator to the welding station. We recognize, however, that larger beams, say about 5 to 7 inches (0.13 to 0.18 m) in diameter, will diverge proportionately less over the same distances.

It is the aim of this invention to utilize these phenomena to control the ultimate size of the focal spot at the welding location irrespective of significantly different distances of travel of the laser beam.

SUMMARY OF THE INVENTION

In accordance with the invention the relatively small diameter laser beam generated at one location, and of a size subject to diverging significantly in a large transport distance, is enlarged closely adjacent the generator location to a larger beam diameter subject to diverging significantly less in the same transport distance, and then transporting the enlarged beam to a second location closely adjacent the relatively remote welding station, and then reducing the enlarged beam to a diameter of a size selected for the welding and for directing the reduced diameter beam to the station.

DESCRIPTION OF THE PREFERRED EMBODIMENT

Figure 1:
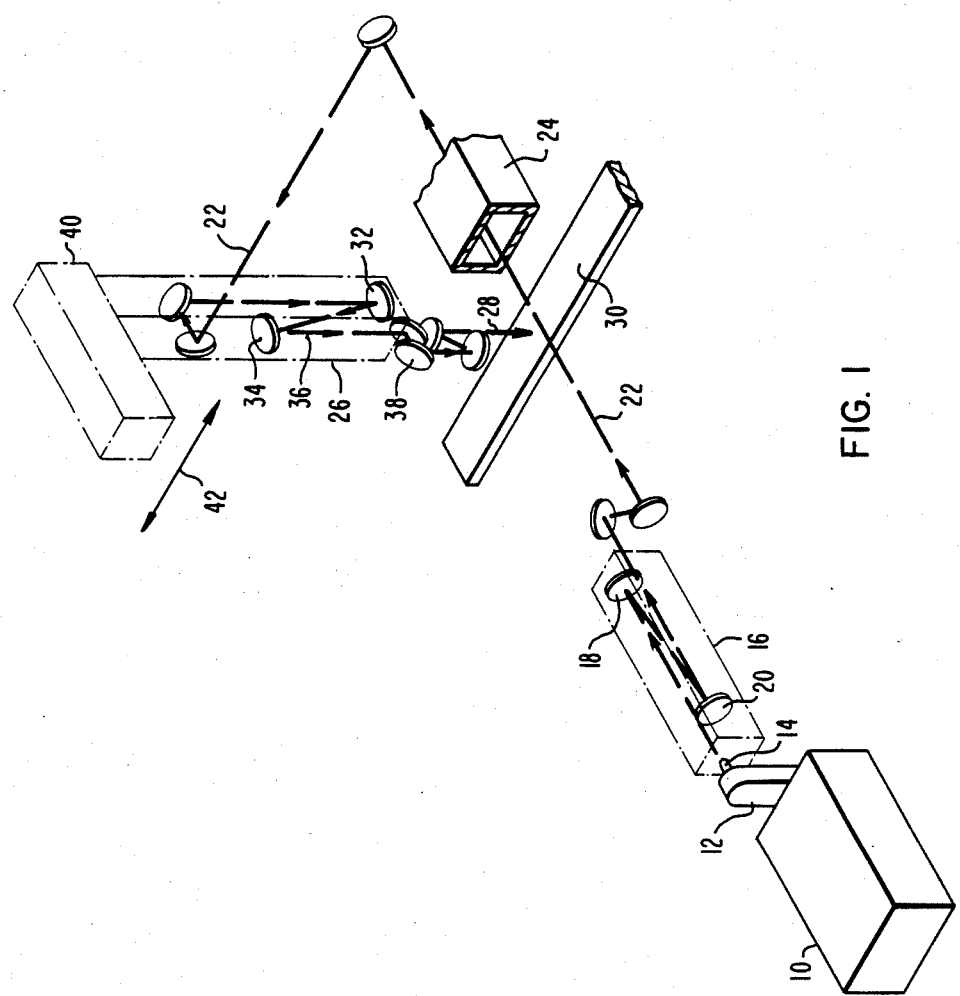
FIG. 1 is a somewhat diagrammatic isometric view of a system according to the invention.

In FIG. 1 a laser generator 10 which, by way of example only, may be a high power continuous wave $CO_2$ laser, outputs from the beam director 12 a laser beam 14 of relatively small diameter, such as 2 to 3½ inches (0.05 to 0.09 m) received by the beam expander 16 located relatively closely adjacent the generator 10.

The beam expander 16 is provided with mirror optics 18 and 20 selected to increase the beam diameter to a size and a range of about 5 to 7 inches (0.13 to 0.18 m).

The expanded beam 22 is then directed by various other mirror optics and usually through an enclosed duct 24 over the transport distance and to a beam reducer 26 located closely adjacent the welding station 28 located above the schematically illustrated workpiece 30. The beam reducer 26 includes mirror optics 32 and 34 which reduce the diameter of the beam to the size selected for welding purposes. The reduced size beam 36 permits the use of smaller mirrors such as at 38 in the workhead at the station thereby resulting in a smaller overall workhead size. The beam reducer 26 and the workhead are supported from the schematically shown gantry crane beam 40 which is adapted to travel back and forth in the direction indicated by the arrows 42.

It is to be appreciated that the welding station may have to travel linearly 50 or more feet (15 or more m) if the workpiece is a large vessel or other large object requiring a weld for such distances.

Figure 2:
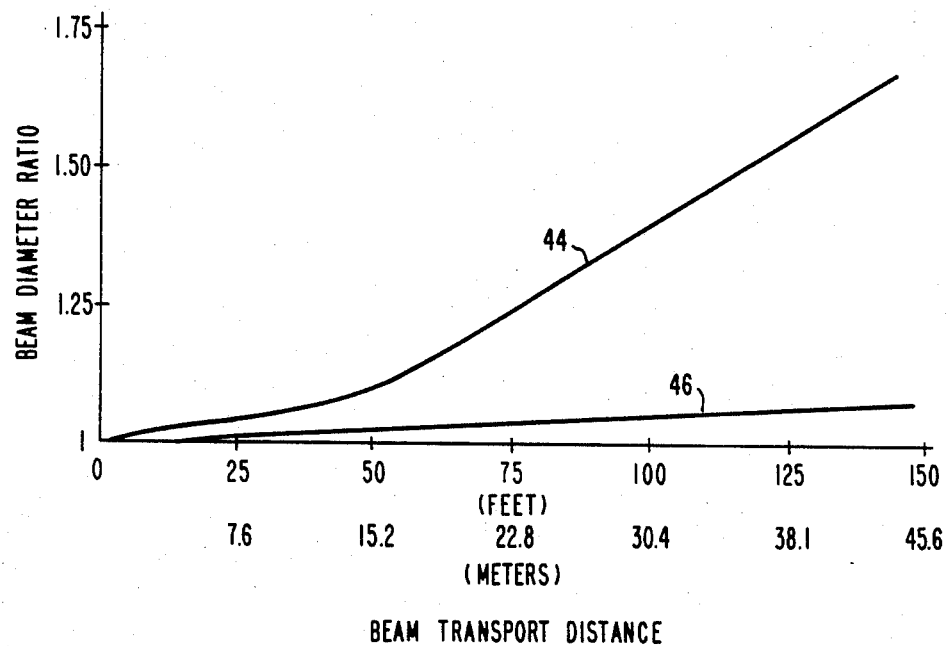
FIG. 2 is a graph illustrating the beam divergent characteristics of two different beams over transport distances up to 150 feet (46 m).

FIG. 2 is intended to make the advantages of the invention apparent. The ordinate of the graph is the ratio of the diverged beam diameter to the original diameter of the beam while the abscissa represents the beam transport distance. Line 44 represents a 3.5 inch (0.09 m) beam while line 46 represents a 6 inch (0.15 m) beam. As may readily be seen, the beam of line 44 has diverged about 25% in a distance of 75 feet (23 m) while the line 46 beam has diverged well under 10% in a transport distance of a 150 feet (46 m). The actual measured change in beam diameter of the 6 inch (0.15 m) beam over a range of the working travel of 75 to 150 feet (23 to 46 m) were in the order of 3 to 5% which is well within the constancy required for adequately uniform welds.

The arrangement according to the invention avoids requirements, in the absence of the invention, of either providing a welding control system which would have to be programmed to compensate for the variation in focal spot size by adjusting either the laser power or the speed of travel of the welding head or both.

We claim:

1. A laser beam transport system for laser welding at a relatively remote welding station comprising:
    a laser generator at one location relatively remote to said welding station producing a laser beam of a given diameter significantly under 0.13 meters;
    means for expanding said beam closely adjacent said one location to about at least 0.13 meters diameter;
    means for directing the expanded beam to a second location relatively closely adjacent said welding station;
    means for reducing said expanded beam to a reduced diameter selected for the welding process and for directing said reduced diameter beam to said station; and
    means for moving said beam reducing means and the reduced beam linearly along the length of said work station which has a high range in excess of 15 meters in length, whereby the reduced beam diameter is sufficiently constant to provide a uniform weld along the entire length of said work station.

2. A laser beam transport system for laser welding at a relatively remote welding station comprising:

a laser generator at one location relatively remote to said welding station producing a relatively small diameter laser beam of a size subject to diverging up to, say, about 25% in a transport distance, say, about 23 meters;

means for expanding said beam closely adjacent said one location to a large diameter beam subject to diverging less than, say, about 10% in a transport distance of, say, about 23 to 46 meters;

means for directing the expanded beam to a second location relatively closely adjacent said welding station;

means reducing said expanded beam to a reduced diameter beam selected for the welding process and for directing said reduced diameter beam to said welding station; and means for moving said beam reducing means and the reduced beam linearly along the length of said work station which has a high range in excess of 15 meters in length, whereby the reduced beam diameter is sufficiently constant to provide a uniform weld along the entire length of said work station.

3. The system according to claim 2 wherein said relatively small diameter beam is in the range of about 0.05 to 0.1 meters; and said larger diameter beam is in the range of about 0.13 to 0.18 meters.

4. The method of obtaining a desired focal spot diameter for laser welding at a relatively remote laser welding station, comprising:

generating a relatively small diameter laser beam at one location relatively remote to said welding station, of a size subject to diverging up to, say, about 25% in a transport distance of, say, about 23 meters;

expanding said laser beam closely adjacent said laser generator location to a larger diameter beam subject to diverging less than, say, to about 10% in a transport distance of, say, about 23 to 46 meters;

directing the expanded beam to a second location relatively closely adjacent said welding station;

reducing said expanded beam to a reduced diameter selected to provide the proper focal spot diameter for welding and for directing said reduced diameter beam to said welding station;

moving said reduced diameter focal spot along said welding station having a length, the higher range of which is in excess of 15 meters; and maintaining the reduced diameter focal spot sufficiently constant along the length of the work station to provide a uniform weld along the entire length of said work station.

* * * * *